3,619,840
ELECTRON BEAM EVAPORATION SOURCE
Vernon C. Spellman, Santa Rosa, Calif., Nils H. Bergfelt, Stockholm, Sweden, and Edward A. Small, Santa Rosa, Calif., assignors to Optical Coating Laboratory, Inc., Santa Rosa, Calif.
Filed July 10, 1969, Ser. No. 840,777
Int. Cl. H05b 7/00
U.S. Cl. 13—31                     22 Claims

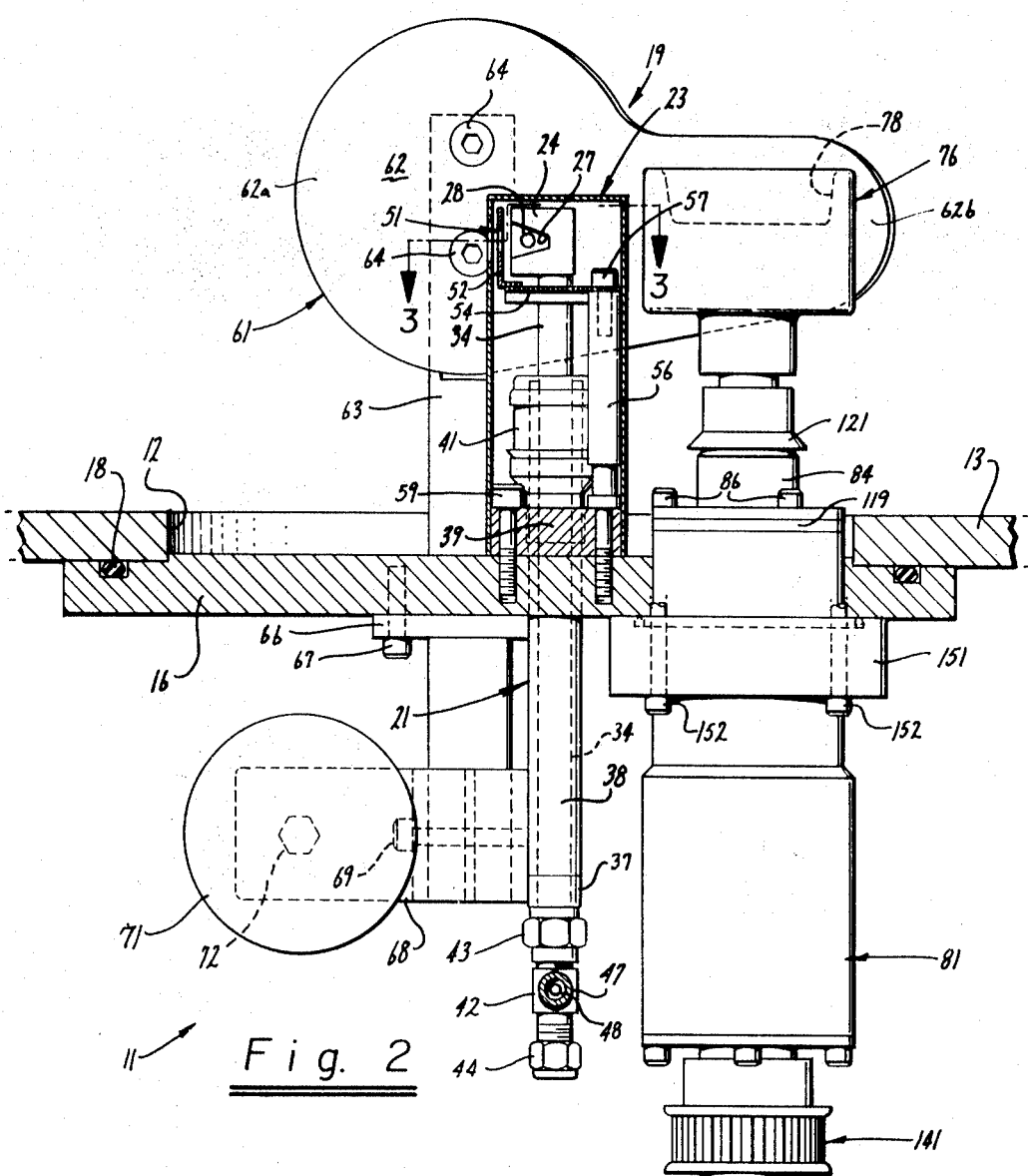
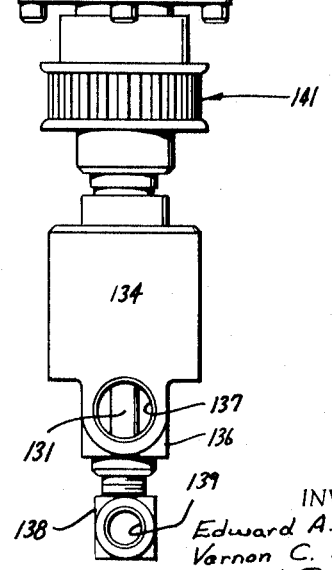
Fig. 2
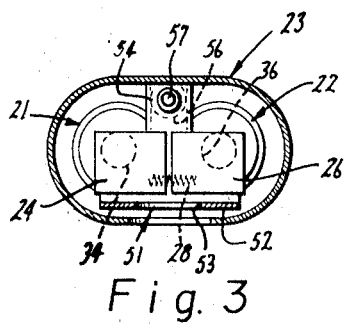
Fig. 3
INVENTORS
Edward A. Small
Vernon C. Spellman
Nils H. Bergfelt
Flehr, Hohbach, Test,
Albritton & Herbert
Attorneys United States Patent Office 3,619,840
Patented Nov. 16, 1971

ABSTRACT OF THE DISCLOSURE

Electron beam evaporation source having at least one electron gun and in which each electron gun is provided with a water-cooled cathode assembly and means is provided for rotating the body of material which is to be evaporated to achieve a more uniform rate of evaporation. To permit operation for long periods of time, means is provided for continuously supplying material to be evaporated. In addition, in order to achieve greater evaporation rates, a plurality of electron guns are utilized for evaporating material from the same body of material.

BACKGROUND OF THE INVENTION

Electron beam evaporation sources have heretofore been provided. However, such sources have not been completely satisfactory because they have lacked the necessary stability to make possible a very uniform evaporation rate. In addition, it has been difficult to obtain a uniform distribution from a source which is repeatable from one time to the next. There is, therefore, a need for a new and improved electron beam evaporation source.

SUMMARY OF THE INVENTION AND OBJECTS

The electron beam evaporation source consists of a base plate which is formed of a non-magnetic material. At least one electron gun is mounted on the base plate. Each gun includes a cathode assembly which is adapted to emit a stream of electrons. An anode assembly is mounted on the base plate for accelerating the electrons away from the cathode assembly. Means is provided for supplying a body of material which is to be evaporated. Means is mounted on the plate and forms a magnetic field in the vicinity of the electron stream as it passes from the cathode assembly to cause the same to travel in a path to strike the body of material to evaporate the same. Means is provided for rotating the body of material so that a uniform evaporation rate is obtained. In order to achieve a still more uniform evaporation rate from the source, a plurality of electron guns can be utilized in which the beams from the guns are all directed to the same body of material. For a high output rate, the electron guns are water cooled.

In general, it is an object of the present invention to provide an electron beam evaporation source which includes an electron gun which is very stable in its operation and makes possible a very uniform evaporation rate.

Another object of the invention is to provide a source of the above character in which the body of material which is being evaporated is rotated to achieve a more uniform evaporation rate.

Another object of the invention is to provide a source of the above character in which a very symmetrical and repeatable distribution of evaporant is obtained.

Another object of the invention is to provide a source of the above character which is water-cooled to permit operation with high power inputs.

Another object of the invention is to provide a source of the above character in which a plurality of electron guns can be utilized to direct electron streams at the same body of material.

Another object of the invention is to provide a source of the above character which can be operated continuously for long periods of time.

Another object of the invention is to provide a source of the above character in which the body of material is continuously fed so that material is continuously available for evaporation.

Another object of the invention is to provide a source of the above character in which very uniform rates of evaporation can be obtained.

Another object of the invention is to provide a source of the above character which can be readily operated.

Additional objects and features of the invention will appear from the following description in which the preferred embodiments are set forth in detail in conjunction with the accompanying drawing.

BRIEF DESCRIPTION OF THE DRAWINGS

FIG. 2 is a cross-sectional view taken along the line 2—2 of FIG. 1.

FIG. 3 is a top plan view looking along the line 3—3 of FIG. 2.

DESCRIPTION OF THE PREFERRED EMBODIMENTS

Figure 1:
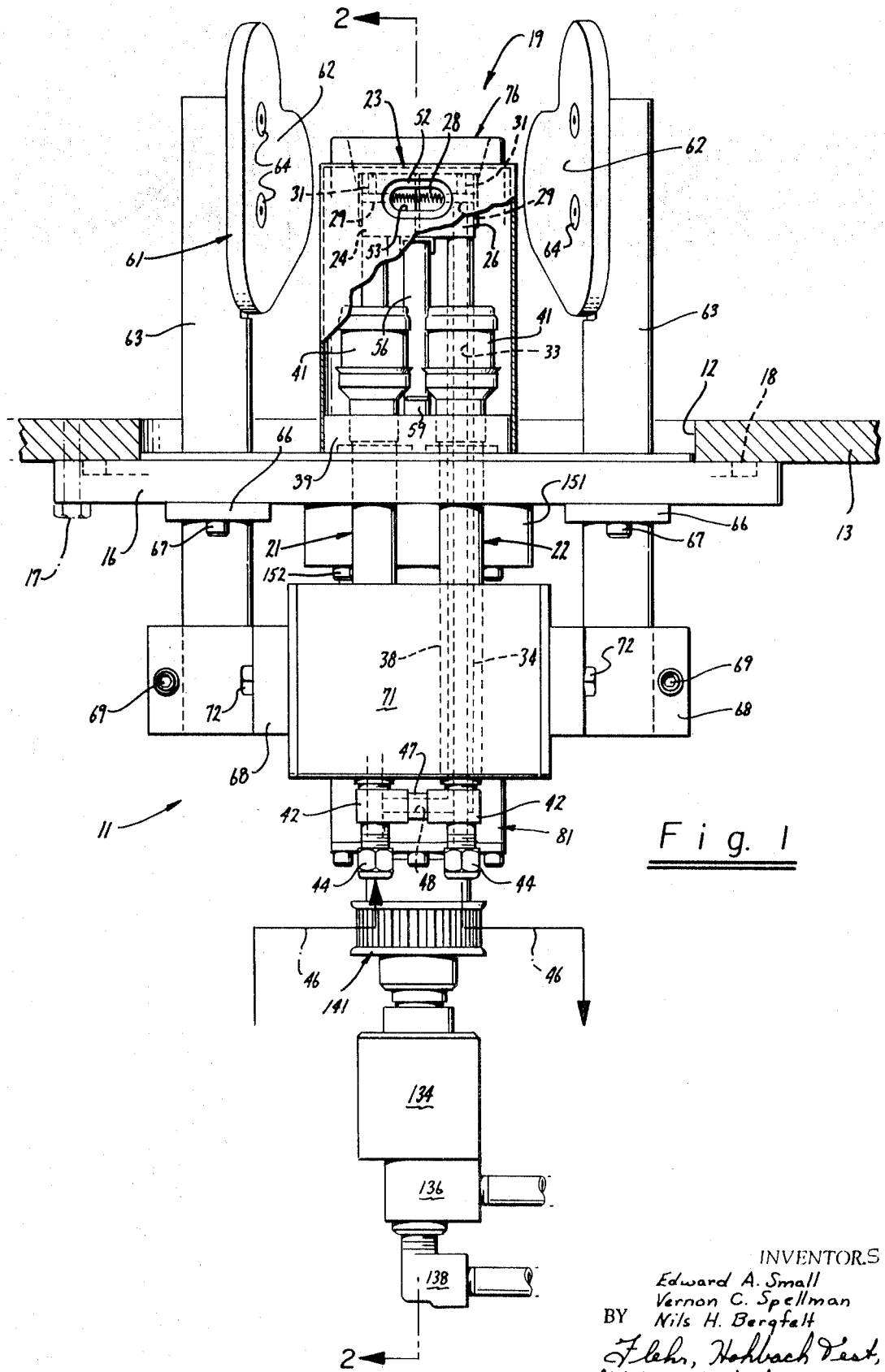
FIG. 1 is a front elevational view of an electron beam evaporation source incorporating the present invention and utilizing a single electron gun in which certain parts have been broken away.

The electron beam evaporation source 11 which is shown in FIGS. 1–3 of the drawings is adapted to be mounted in an opening or port 12 provided in a side wall 13 of a vacuum chamber of a relatively large size. Since such vacuum chambers are substantially conventional, the vacuum chamber itself is not shown.

The electron beam evaporation source consists of a base or port plate 16 formed of a non-magnetic material which is a size slightly larger than the hole 12 and is adapted to be secured to the side wall 13 by screws 17. An O-ring 18 is provided for making a seal between the side wall 13 and the base plate 16. An electron gun 19 is mounted on the plate 16 and consists of a pair of feed-through assemblies 21 and 22 which are mounted in the base plate 16. The gun 19 also consists of a cathode assembly 23 which is mounted on the feed-through assemblies 21 and 22.

The cathode blocks 24 and 26 are insulated from each other and are provided with generally V-shaped recesses 27 which face in an outward direction as viewed in FIG. 2 and in which there is disposed a filament 28. Each of the blocks 24 and 26 is provided with a horizontal bore 29 through which the helically wound filament 28 is inserted. The filament 28 is held in place by set screws 31 extending downwardly through the cathode blocks 24 and 26 to engage the opposite ends of the filament 28. Since the ends of the filament 28 are mounted in the horizontal bores, the filament 28 is kept in a precise vertical alignment. This facilitates changing of the filament where required. It is merely necessary to remove the set screws 31 and to remove the filament 28 and to place another filament in the bores to provide a filament which is properly disposed in a vertical direction. Thus, it can be seen that the filament arrangement requires no horizontal adjustment and no vertical adjustment.

The filament 28 also is relatively simple in that it is merely a helical tungsten coil. The length of the coil is not critical. It is merely necessary that it be long enough to extend between the two cathode blocks 24 and 26 and to be secured therein by the set screws 31. The construction of the filament 28 and the cathode blocks 24 and 26 and to be secured therein by the set screws 31. The construction of the filament 28 and the cathode assembly 23 also has an additional advantage in that it is relatively easy to change the operating voltage. For example, to reduce the operating voltage, it is merely necessary to insert a filament 28 which has a different pitch i.e., 12 turns per inch rather than 18 turns per inch, to decrease the resistance so that the voltage applied can be reduced and still retain the same current flow through the filament.

Each of the feed-through assemblies 21 and 22 consists of an inner tube 33 and an outer tube 34 which are mounted in the cathode assembly 23. Each of the cathode blocks 24 and 26 is provided with a bore 36 which receives the outer tube 34 and which is soldered therein. The right-hand end of the inner tube 33, as viewed in FIG. 1, also extends into the bore. A brass adapter 37 is mounted on the lower end of the outer tube 34. A sleeve 38 of a suitable insulating material such as Teflon is mounted on the outside of the outer tube 34 and extends from the adapter 37 through a flange 39 and into a ceramic terminal assembly 41 which is mounted upon the flange 39. The adapter 37 extends into a fitting 42 and is secured thereto by a packing nut 43. A nut 44 is also provided on the fitting 42 and connects a hose 46 to the fitting. A nipple 47 of a suitable insulating material such as nylon is provided for connecting the fittings 42 of the feed-through assemblies 21 and 22. The nipple 47 also includes a pipe section 48 which interconnects the inner tubes 33 of the feed-through assemblies 21 and 22 in such a manner that the inner tubes 33 are interconnected and so that the space between the inner tubes 33 and the outer copper tubes 34 are in communication with each other.

As shown in FIG. 1 of the drawings, one of the hoses 46 is provided for supplying water to the feed-through assemblies 21 and 22, whereas the other hose 46 is provided for removing the water from the feed-through assemblies. With the arrangement shown, it can be seen that water is supplied through the inner tubes 33 and flows upwardly into the cathode blocks 24 and 26 to cool the same and then passes downwardly in the space between the inner tubes 33 and the outer tubes 34 to discharge through the other hose 46.

Since the cathode blocks 24 and 26 are water-cooled at all times, there is no substantial thermal expansion and contraction when the electron beam evaporation source is put into operation and taken out of operation. This makes it possible to ensure that there is always a good contact between the cathode blocks 24 and 26 and the filament 28.

An anode assembly 51 is provided which consists of an anode plate 52 that is disposed in front of the recesses 27 provided in the cathode blocks 24 and 26 of the cathode assembly 23. The anode plate 52 is provided with an oval shaped aperture 53 as shown in FIG. 1. The anode plate 52 is carried by a support bracket 54 which is mounted upon an anode support post 56 by a cap screw 57. The support post 56 is secured to the flange 39 by suitable means such as a cap screw (not shown). The flange 39 is secured to the base or port plate 16 by cap screws 59.

The electron gun also includes beam focusing means 61 which consists of a pair of large ear-shaped plates 62 each having a frontal, generally circular portion 62a and a rear lobe-like portion 62b. The plates 62 are carried by pole pieces or ports 63 that are secured thereto by screws 64. The plates 62 are mounted upon the posts 63 in such a manner that they diverge outwardly in a forward direction as can be seen from FIG. 1. As can be seen in FIG. 2, the plates 62 are generally centered with respect to the filament 28 of the cathode assembly 23. The posts 63 are mounted in mounting flanges 66 that are secured to the base plate 16 by cap screws 67. A pair of brackets 68 are secured to the mounting flanges 68 by clamping them thereto by the use of cap screws 69. A large coil 71 with a soft iron core is secured to the brackets 68 by cap screws 72.

The structure which is hereinbefore described creates an electron beam which is adapted to impinge upon material carried within a crucible 76. The crucible 76 is water-cooled and means 77 is provided for rotating the crucible. The crucible 76 is formed of a suitable material such as copper and is provided with cup-shaped recess 78 that carries the body of material which is to be evaporated by the electron beam evaporation source. The means 77 for rotating the crucible consists of a hollow spindle 79 which is rotatably mounted in a housing 81 by a pair of spaced ball bearing assemblies 82. The housing 81 is provided with a pair of cover plates 83 and 84 which are secured to the housing by cap screws 86. As can be seen from FIG. 4, the cover plate 83 engages the outer race of one of the ball bearing assemblies 82 and the outer race of the two ball bearing asemblies 82 are held in spaced apart positions by a bearing spacer 87. The spindle 79 is held in position within the bearing assemblies 82 by a pair of retaining rings 88 engaging one of the bearing assemblies. Another retaining ring 91 is mounted adjacent the retaining ring 88 and is provided with an annular recess 92 that receives one end of a spring 93. The other end of the spring 93 is disposed in another annular recess 94 carried by a rotating face ring 96. The rotating face ring 96 is provided with an annular recess 97 that has disposed therein an O-ring 98 which encircles the spindle 79. The rotating face ring 96 engages a graphite sealing ring 99 carried by a stationary face ring 101. The stationary face ring 101 is provided with a pair of spaced annular recesses 102 on its outer circumferential surface in which are disposed O-rings 103 to establish a sealing engagement between the stationary face ring and the housing 81. An annular recess 104 is provided in the stationary face ring between the O-rings 103 and is in communication with a port 106 provided in the housing 81 which is adapted to be connected to a source of vacuum. The stationary face ring 101 carries an additional graphite sealing ring 107 which is engaged by a rotating face ring 108. The face ring 108 is provided with an annular recess 109 which receives one end of a compression spring 111. The other end of the compression spring is received by an annular recess 112 provided in a retaining ring 113. The retaining ring 113 is held in place by another retaining ring 114 which engages a collar 116 provided on the spindle 79. A spacer 117 is provided which engages the outer race of one of the bearing assemblies 82 and has the other end engaging one side of the stationary face ring 101. The spacer 117 is held in place by a set screw 118. A spacer 119 engages the other side of the stationary face ring 101 and is held in place by the cover plate 84 engaging the same.

A flanged dust ring 121 is mounted on the spindle 79 and is secured thereto by a set screw 122. An O-ring 123 is disposed between the cover plate 84 and the dust ring 121 and engages the spindle 79. The crucible 76 is secured to the spindle 79 by a set screw 126 and a retaining ring 127. An O-ring 128 is provided for establishing a good seal between the crucible 76 and the spindle 79. A large cavity 129 is provided in the crucible immediately below the cup-shaped recess 78 and is adapted to receive water for cooling of the crucible.

An inner pipe 131 is provided within the hollow spindle 76 and extends upwardly into the cavity 129. The inner pipe 131 is of such a size that there is an annular space provided between the inner wall of the spindle and the outer wall of the inner pipe to provide an annular passage 132 through which water can be introduced into the cavity 129 and then discharged through the inner pipe 131. The spindle 79 and the inner pipe 132 extend into a stationary union 134.

The union 134 is provided with a fitting 136 that has an opening 137 adapted to be connected to a source of water under pressure to supply water to the union 134 and into the passage 132 between the inner pipe 131 and the inner wall of the spindle 79. The union 134 is provided with another fitting 138 which is provided with an opening 139 in communication with one end of the inner pipe 132. The opening 139 is adapted to be connected to piping to permit the discharge of water passing through the inner pipe 131 after it has cooled the crucible 76.

Figure 4:
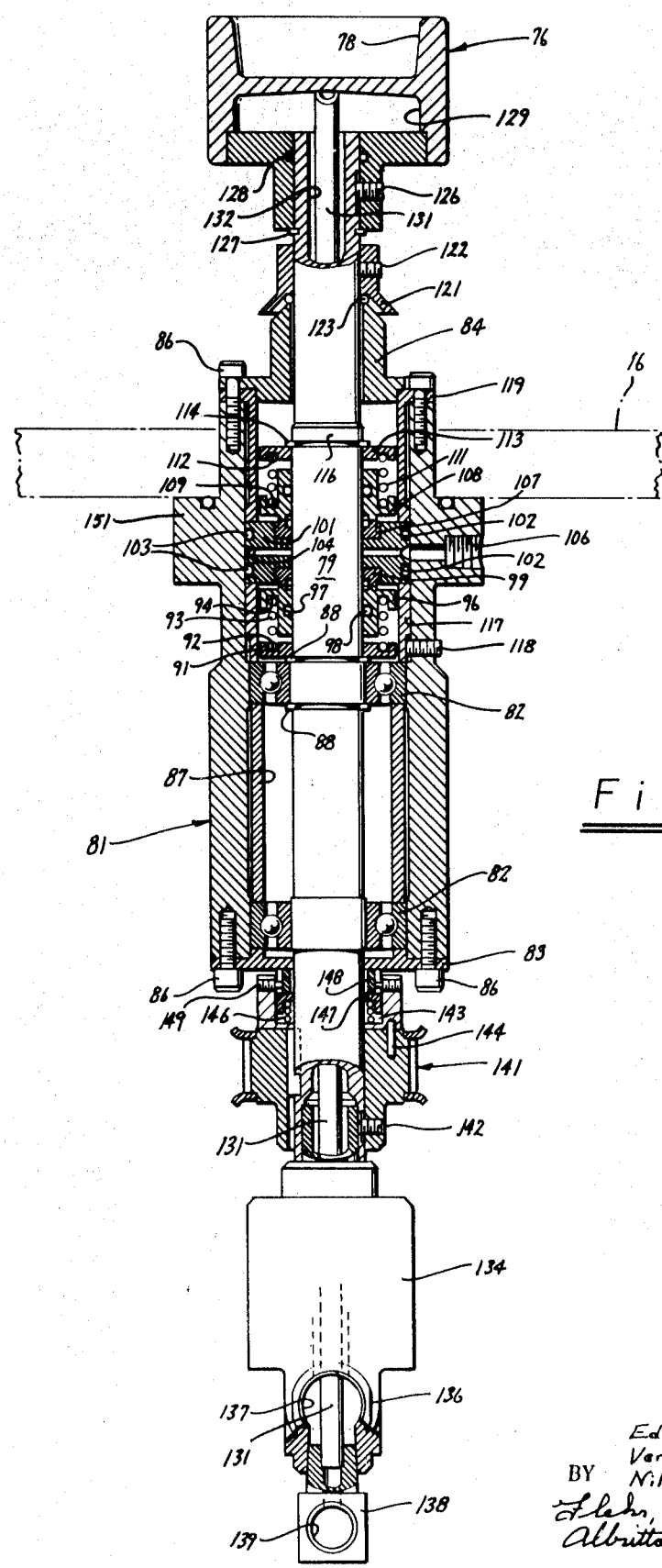
FIG. 4 is an enlarged cross-sectional view of a portion of the evaporation source shown in FIGS. 1 and 2.
Figure 5:
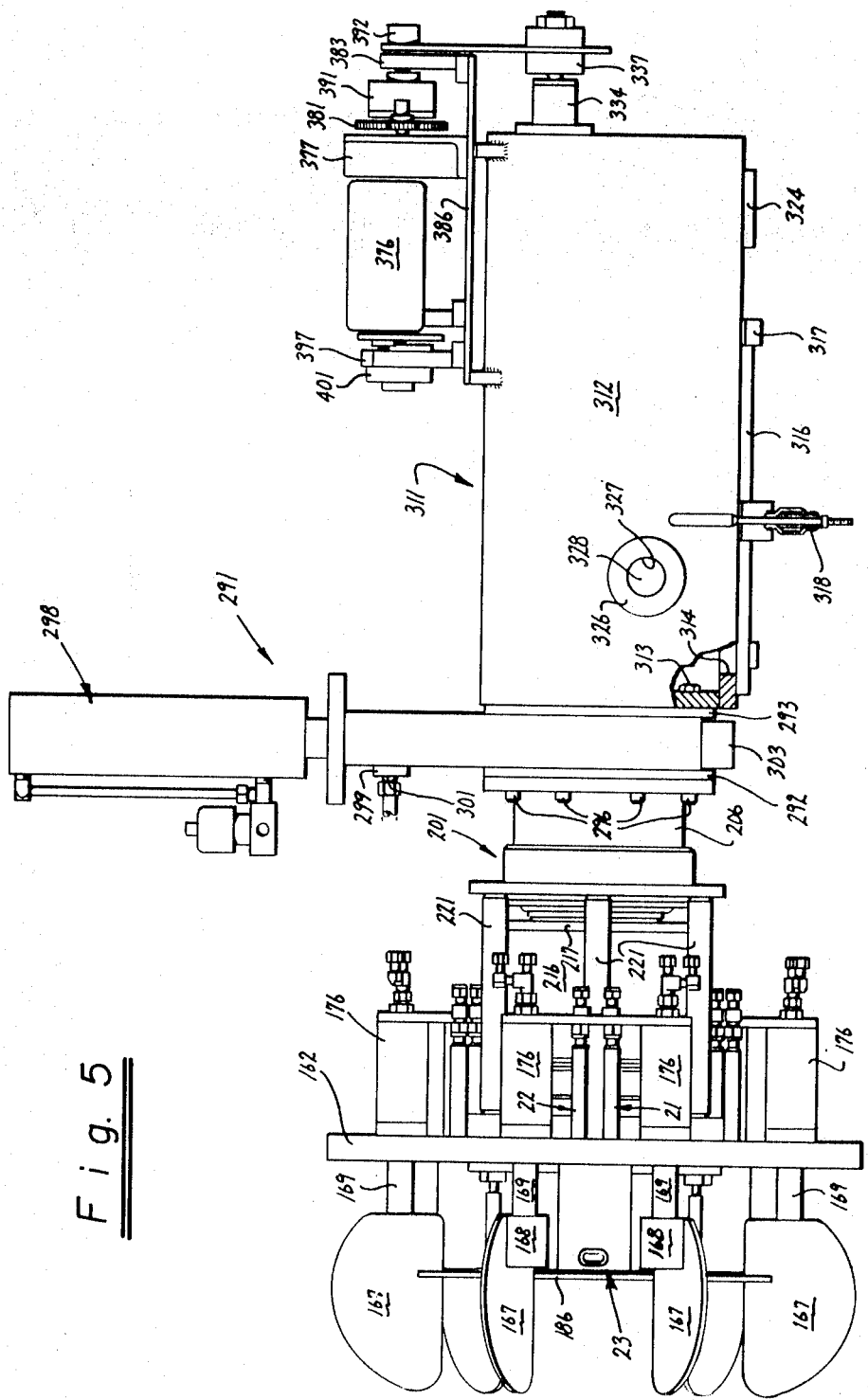
FIG. 5 is a side elevational view of an electron beam evaporation source incorporating another embodiment of the invention and utilizing three electron guns.
Figure 6:
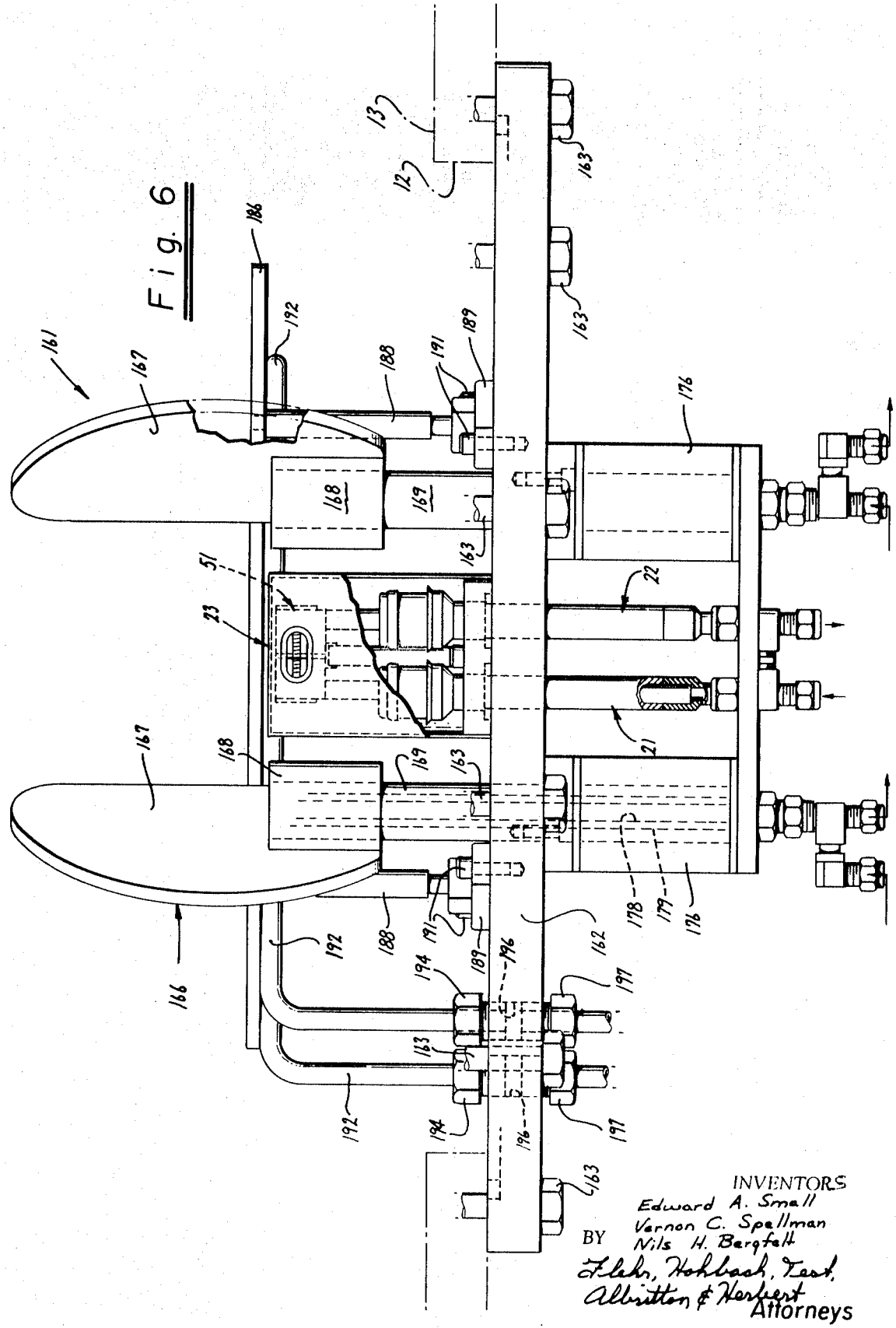
FIG. 6 is a front elevational view of a portion of the source shown in FIG. 5 and showing certain parts broken away.

A timing pulley 141 is mounted on the spindle 79 and is secured thereto by a set screw 142. A spring housing 143 is mounted on the spindle 79 and is secured to the timing pulley 141 so that it rotates therewith by suitable means such as a pin 144 which extends into the spring housing 143 and into the timing pulley 141 as shown in FIG. 4. A compression spring 146 is mounted in the spring housing 143. The compression spring engages a slip ring 147 and the slip ring 147 engages a carbon or graphite ring 148 which is yieldably urged into engagement with the cover plate 83. The carbon ring 148 is centered with respect to the spindle 79 by a plurality of set screws 149. This ensures that the carbon ring 148 will rotate with the spindle as it is rotated by the timing pulley 141. The carbon ring ensures that there is good contact between a housing 81 and the spindle 79 and that there will be no tendency for current to flow in the ball bearing assemblies 82.

The housing 81 is secured to the base plate 16 by a large collar 151 which is secured to the base plate 16 by cap screws 152 (see FIG. 3).

Operation and use of the electron beam evaporation source may now be briefly described as follows. Let it be assumed that the electron beam evaporation source has been connected to a suitable source of electrical power. For example, let it be assumed that the feed-through assemblies 21 and 22 have been connected to a suitable source of power such as 12 volts A.C. and that at the same time there is supplied thereto a suitable high voltage D.C. such as 10,000 volts. Typically, the high voltage can be attached to the center tap of the filament transformer.

Let it be assumed that water is connected into the tube 46 for supplying water to the feed-through assemblies 21 and 22 and that similarly water is being supplied to the union 134. Also, let it be assumed that suitable motive means has been provided such as an electric motor which drives a belt which, in turn, drives the timing pulley 141 to rotate the crucible 76. Also, let it be assumed that the crucible 76 has been provided with a body of material which is to be evaporated by placing it within the cavity 78 provided in the crucible.

As soon as filament current is supplied to the filament 28, the filament 28 heats up and emits electrons which are negative with respect to the anode plate 52 and thus are accelerated by the anode plate and pass through the anode aperture 53 to form a collimated or condensed electron beam. This electron beam is further shaped and bent to travel through a substantially 270° arcuate path by virtue of the ear-shaped plates 72 to cause the electron beam to follow a path indicated by the dotted line 156 and to impinge upon the body of material carried within the recess 78 of the crucible 76 to cause progressive evaporation of the material carried within the crucible. Since the beam is shaped, contact with the body material within the crucible by the electron beam is generally in a small area so that substantially all of the power of the beam is directed into the crucible for evaporation of the material.

The circuit for the electron beam is completed through the body of material in the crucible and through the copper crucible 76 and then down through the spindle 79 which is maintained at ground potential by the grounded graphite ring 148 which engages the stationary housing 81. As pointed out above, the presence of the graphite ring 148 assures that current will not flow through the ball bearing assemblies 82 and pit the same.

The exhausting of the water through the central tube 132 for cooling the crucible is advantageous because this causes any water bubbles which may be formed within the space 129 to be drawn out through the exit tube 132 rather than remaining in the space 129 to cause hot spots to occur in the crucible.

The port 106 which is connected to a source of vacuum ensures that if there is any leakage between the base plate 16 that the pressure will still be further reduced by pumping being applied to the port 106. With the assembly shown, it can be seen that graphite sealing rings are provided and that there are in effect two seals with an exhaust line between the same. Thus, it can be seen that if the actual pressure difference between the first seal and the second seal is reduced, the next seal is further sealed and consequently there is a more reliable sealing action which takes place.

During the time that all this is occurring, the crucible 76 is being rotated at a uniform speed. This is important because it ensures that a uniform evaporation is obtained from the crucible. This is particularly effective for obtaining uniform evaporation where the beam is caused to impinge upon the crucible slightly off center so that evaporation of the material occurs from a ring. The diameter of this ring can be changed either by shifting the beam so it impinges farther or closer to the center of the crucible. With the cooling, no hot spots will occur and, therefore, the evaporation from the crucible should be very uniform.

Because the cathode assembly which carries the filament is water-cooled, a very uniform source of electron beam is provided which also helps to ensure that material will be evaporated from the crucible 76 at a very uniform rate. Thus, the source provides a very symmetrical and repeatable distribution of evaporant from the crucible 76.

Another embodiment of the electron beam evaporation source is shown in FIGS. 5–9 and differs principally from the preceding embodiment in that three electron guns 161 have been provided rather than one electron gun. The electron beam evaporation source consists of a base or port plate 162 which is adapted to be mounted upon the side wall 13 of the evaporation chamber and to be secured thereto by cap screws 163. As can be seen, the electron guns 161 extend into the opening 12 provided in the wall 13. The three electrons guns 161 are mounted upon the base plate 162 and, in general, have a construction very similar to the electron gun 19 previously described and shown in FIGS. 1–4. For example, the feed-through assemblies 21 and 22 for each of the electron guns are substantially identical to those hereinbefore described and the parts therefor carry corresponding numbers. The same is true with respect to the cathode assembly 23 and the anode assembly 51. The cathode assembly 23 is water-cooled as in the previous embodiment and water is introduced and returned through both of the feed-through assemblies 21 and 22.

The beam focusing means 166 provided for each of the electron guns 161 differs from the beam focusing means 61 hereinbefore described because of the necessity of being able to more precisely control the angle of the beam from the electron gun. The beam focusing means consists of plates 167 which have a shape which is significantly different from that of the plates 62. The plates 167 generally have a semi-circular appearance as can be seen from FIG. 5 in which the lower part has been cut off to give a truncated semi-circular appearance. The plates 167 are mounted at an angle with respect to the cathode assembly 23 and are secured by U-shaped clamps 168 to posts 169. The clamps 168 are secured to the plates 167 by cap screws 171. A mounting flange 172 is provided for each of the posts 169 for securing the posts 169 to the plate 162. The mounting flanges 172 are secured to the plate 162 by cap screws 169. A coil 176 is mounted on the bottom end of each of the posts 173. A coil connecting bar 177 connects the bottom ends of the coils 176.

Means is provided for cooling the coils 176 and the feed-through posts 169 and consists of an inner pipe 178 and an outer pipe 179 disposed within the posts 169. A water manifold 181 is provided for supplying water to the inner pipe 178 and for removing water through the outer pipe 179 provided on each of the feed-through posts 169 in much the same manner that water is supplied to and removed from the feed-through assemblies 21 and 22.

Figure 7:
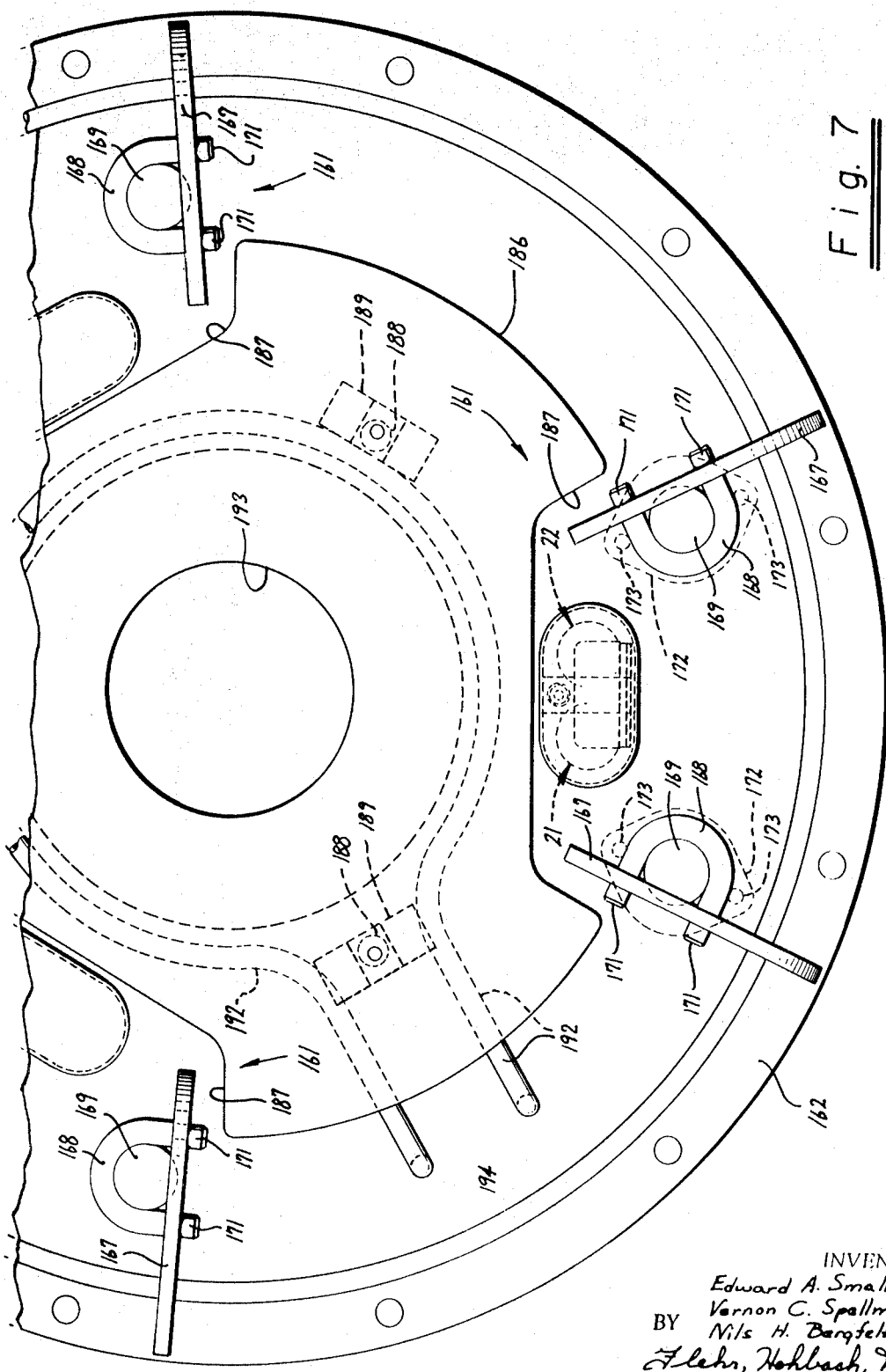
FIG. 7 is a partial top plan view of the source shown in FIG. 5.

As can be seen particularly from FIG. 7, the three electron guns 161 are spaced 120° apart around a circle. A water-cooled shield 186 is mounted between the electron guns 161 and is provided with cut-outs 187 spaced 120° apart which accommodate the electron guns. The shield is supported at a spaced position from the base plate 162 by support posts 188 which are threaded into the shield and which are mounted upon the base plate 162 by flanges 189. The flanges 189 are secured to the base plate 162 by cap screws 191. Water-cooling is provided for the shield 186 in the form of an elongate tube 192 which is formed into a circle concentric with a centrally disposed opening 193. The tube 192 is connected to fittings 194 mounted in the base plate 162 to connect the same to a passage 196 provided in the plate 162 and which is connected by fittings 197 to suitable piping (not shown) so that water can be introduced through one end of the tube 192 and pass through the tube and be discharged through the other end of the tube 192.

Figure 8:
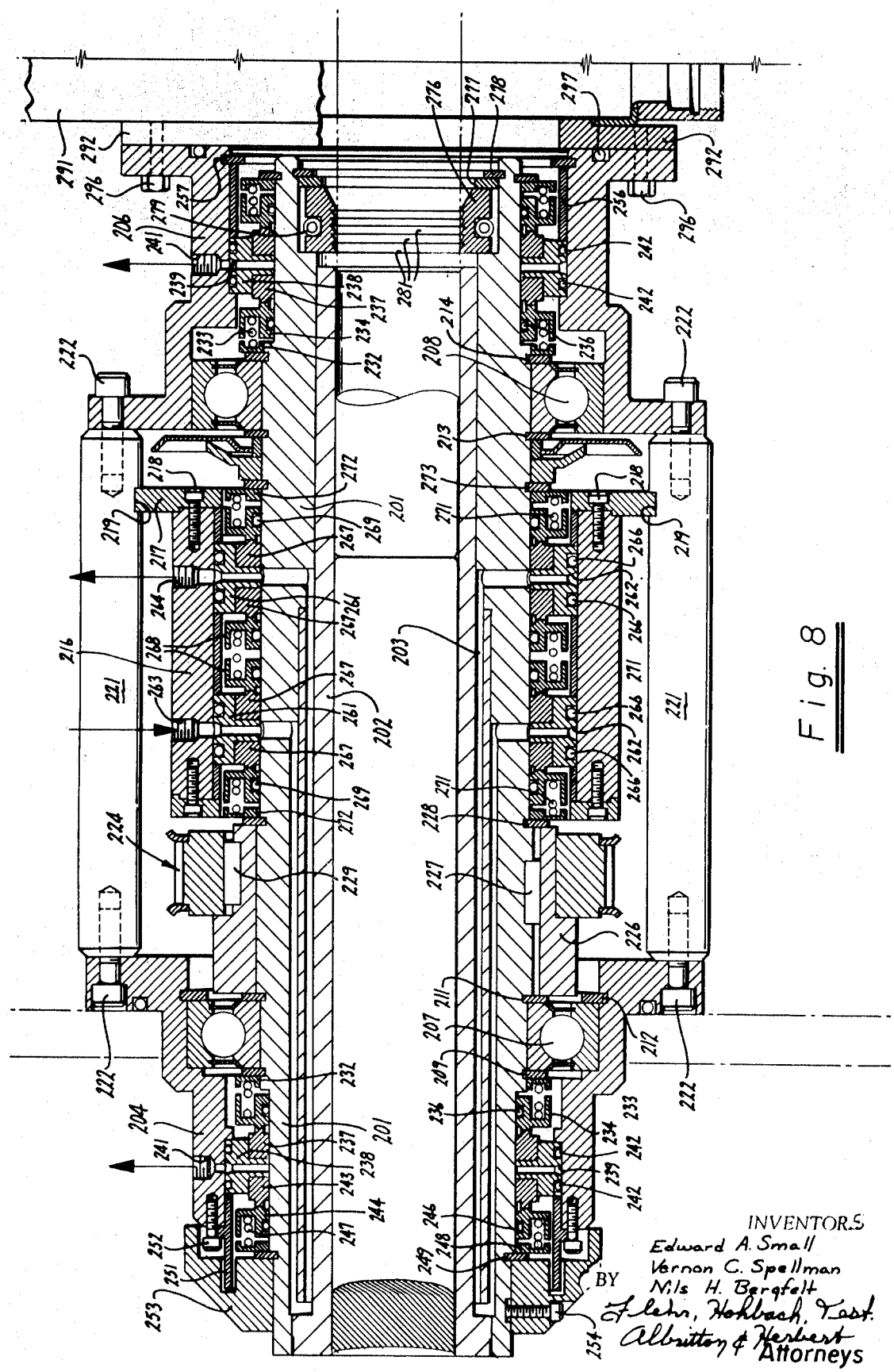
FIG. 8 is an enlarged cross-sectional view of the spindle assembly utilized in the source shown in FIG. 5.

Means is provided for supplying an ingot through the opening 193 in the shield 186 and consists of a spindle assembly 201 which is shown particularly in FIG. 8. The spindle assembly 201 consists of a hollow spindle 202 which is provided with a water jacket 203. The hollow spindle 202 is rotatably mounted in upper and lower collars 204 and 206, respectively, by ball bearing assemblies 207 and 208, respectively. The ball bearing assembly 207 has its inner race secured to the spindle 202 by retaining rings 209 and 211 and has its outer race secured to the upper collar 204 by retaining ring 212. The bearing assembly 208 is secured to the hollow spindle 202 by retaining rings 213 and 214.

A water seal housing 216 is mounted between the upper and lower collars 204 and 206 and is provided with a collar 217 which is secured thereto by cap screws 218. The collar 217 is seated in the slots 219 provided in spacer rods 221. The spacer rods 221 are secured to the upper and lower collars 204 and 206 by cap screws 222.

Means is provided for rotating the spindle assembly 201 and consists of a timing belt pulley 224 which is mounted upon a hub 226 secured to the hollow spindle 202 by a key 227. The hub 226 is also secured to the hollow spindle 202 by a retaining ring 228. The pulley 224 is keyed to the hub 226 by a key 229.

Generally similar sealing assemblies 231 are provided in each of the upper and lower collars 204 and 206. Each of the sealing assemblies 231 consists of a retaining ring 232 which is seated against a retaining ring that carries a plurality of compression springs 233. The compression springs 233 engage another retaining ring 234 which carries an O-ring 236 adapted to make sealing engagement with the hollow spindle 202. The retaining ring 234 engages a carbon or graphite ring 237 carried by one side of a stationary face ring 238. The face ring 238 is provided with an annular passage 239 which is in communication with a port 241 that is adapted to be connected to a source of rough vacuum. The face ring 238 carries a pair of O-rings 242 on opposite sides of the port 241. The face ring 238 also carries another graphite or carbon seal ring 243 which is engaged by a retaining ring 244. The retaining ring 244 carries an O-ring seal 246 and is yieldably urged into engagement with the carbon seal ring 243 by springs 247 engaged by retaining ring 248. The retaining ring 248 is held in place by a retaining ring 249 mounted in the spindle 202. In the upper collar 204, the face ring 238 is held in place by a flange ring 251 which is secured to the upper collar by cap screws 252. A dust cover 253 is mounted over the upper collar 204 and is secured to the spindle 202 by a set screw 254.

In the lower collar 206, the face ring is held in place by a sleeve 256 which is retained within the collar by a retaining ring 257.

In the water seal housing 216 there is provided a pair of spaced stationary face rings 261. The face rings 261 are provided with annular passages 262. One of the passages 262 is adapted to be connected to a port 263 through which water is received and the other is in communication with a port 264 through which water is discharged. The face rings 261 are provided with O-rings 266 to form sealing engagement between the face rings and the water seal housing 216. A pair of graphite rings 267 are carried by each of the face rings 261 and establish a seal between the face rings and the spindle 202. A rotating face ring is provided for each side of each of the stationary face rings and carries an O-ring 269 for establishing a sealing relationship between the rotating face ring and the spindle 202. The rotating face ring 216 is yieldably urged towards one of the graphite rings 267 by a spring 271. On the ends, the springs 271 are retained by retaining rings 272 which are held in place by a retaining ring 273 mounted in the spindle 202. With respect to the inner rotating face rings 268, the spring 271 is carried by the opposed rotating face rings 268.

A segmented ingot gripper 276 is mounted in the lower extremity of the spindle 202 and is retained therein by retaining rings 277 and 278. The segmented ingot gripper 276 is yieldably urged inwardly toward an ingot gripping position by a coil spring 279 which encircles the ingot gripper. The ingot gripper is provided with a plurality of annular serrations 281 to facilitate gripping of the ingot.

A gate valve assembly 291 is provided with upper and lower flanges 292 and 293 which have ports formed therein which are in axial alignment with the spindle assembly 201. The flange 292 is secured to the lower collar 206 of the spindle assembly 201 by cap screws 296. An O-ring 297 is provided in the lower collar 206 to establish a sealing engagement between the flange 292 and the collar 206. A pneumatic operator assembly 298 is provided for operating a gate valve member 299 of the gate valve assembly between open and closed positions. The gate valve assembly 291 and the pneumatic operator assembly 298 are of a conventional type and, therefore, will not be described in detail. In general, the pneumatic operator 298 moves the gate valve member 302 between open and closed positions to permit loading of ingots into the spindle assembly 201 as hereinafter described. The gate valve assembly 291 is provided with a flange 299 on its upper side which has a port 301. This port 301 is on the top side of the valve and on the top side of the movable gate valve member 302 (see FIG. 9) and thus can be utilized for maintaining high vacuum on the spindle assembly 201 during the time that the gate valve member 302 is in a closed position. The gate valve assembly 291 is also provided with a viewing port 303 so that the position of the gate valve 302 can be viewed. The viewing port is provided with a lens 304 which is held in place by a retaining ring 306.

An ingot feed mechanism assembly 311 is secured to the gate valve assembly 291. The ingot feed mechanism assembly 311 consists of a housing 312. The housing 312 is secured to the lower flange 293 of the gate valve assembly 291 by cap screws 313. The housing 312 is provided with a large opening 314 which is normally closed by an access door 316. The door 316 is hinged to one side of the housing 312 by hinges 317. The door 316 is adapted to be latched into a closed position by a latching mechanism 318. The door 316 is provided with a port 319. A flange 320 is mounted on the door 316 and is secured to the door 316 by cap screws 321. A lens 322 is carried by the flange 320 and serves to close the port 319. Another port 323 is provided in the housing 312 and is closed by a port plate 324 held in place by cap screws 325. The housing is also provided with a flange 326 which has a port 327 therein. A lens 328 is mounted in the port 327 in the conventional manner to close the port. The housing is also provided with a high vacuum port 329.

Figure 9:
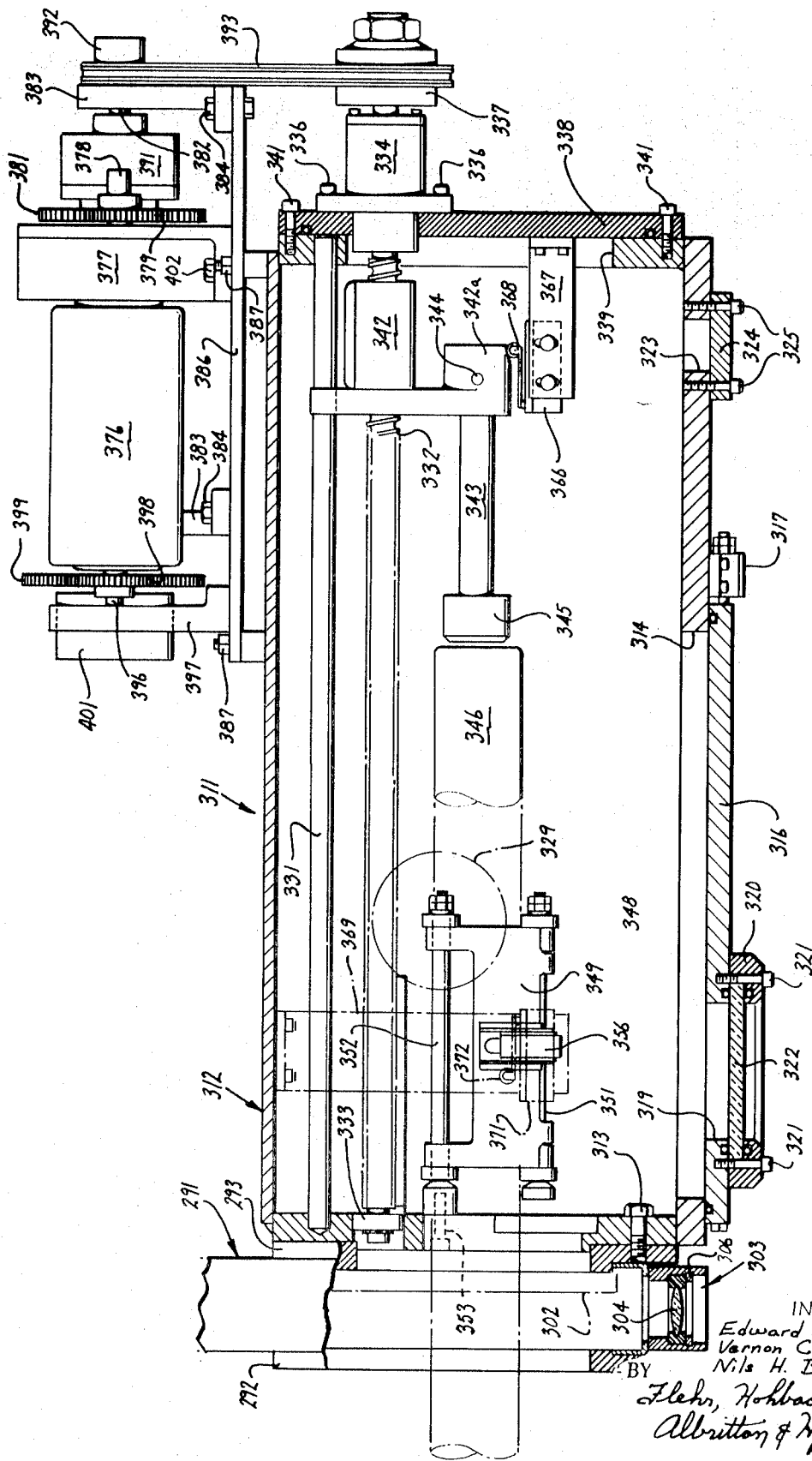
FIG. 9 is an enlarged cross-sectional view of the ingot loading means shown in FIG. 5.

A guide rod 331 is mounted in the housing 312 and extends longitudinally thereof along one side of the same as can be seen from FIG. 9. A lead screw 332 is rotatably mounted in the housing 312 and extends longitudinally of the housing parallel to the guide rod 331. The upper end of the screw 332 is rotatably mounted in a bearing assembly 333 mounted in the housing. The lower portion of the screw 332 is mounted in a bearing assembly 334 secured to the housing 312 by cap screws 336. A combination pulley and overload slip clutch assembly 337 is mounted on the lower end of the lead screw 332 for driving the same. As can be seen, the bearing assembly 334 is carried by a plate 338 which forms a part of the housing 338 and covers an opening 339 provided in the housing. The plate 338 is secured to the remaining portion of the housing by cap screws 341. The guide rod 331 is held in the position shown by securing the plate 338 to the housing. A lead screw follower 342 is mounted on the lead screw 332 and is also slidably mounted on the guide rod 331. The lead screw follower 342 carries a boss-like portion 342a which has an ingot support member 343 secured therein by a pin 344. The ingot support member 343 is provided with a rotatable cap 345 that is adapted to be engaged by the bottom end of an ingot 346 as shown in FIG. 9. An ingot clamp and guide assembly 348 is provided for clamping the upper end of an ingot within the ingot feed mechanism. The clamp assembly consists of a plurality of arcuate members 349 which are hinged together by specially machined bolts 351 and 352. The bolts 352 are secured to the housing 312 by cap screws 353. The arcuate members 349 are latched in a closed position by a spring-loaded latch 356.

Means is provided within the housing 312 for limiting the travel of the lead screw follower 342 and consists of a microswitch 366 mounted upon a bracket 367 secured to the plate 338. The microswitch 366 is provided with an operating arm 368 which is adapted to be engaged by the boss-like portion 342a of the lead screw follower 342. A support plate 369 is provided in the upper end of the housing 312 and similarly carries another microswitch 371 which is provided with an operating arm 372 which is adapted to be engaged by a surface of the follower 342.

Means is provided for driving the pulley and slip clutch assembly 337 and consists of motive means in the form of a reversible electric motor 376 which is provided with two output shafts. One of the output shafts is connected to a speed reducer 377 which has a low speed output shaft 378 that carries a drive pinion 379. The drive pinion 379 drives a spur gear 381 which is mounted on a jack shaft 382. The jack shaft 382 is rotatably mounted in a pair of spaced posts 383 which are secured by cap screws 384 to a base plate 386. The base plate 386 is mounted upon a side wall of the housing 312 by bolts 387 secured to mounting members 388 provided on the housing 312.

An electric clutch 391 is mounted on the jack shaft 382. A pulley 392 is mounted on the outer end of the jack shaft 382 and drives a belt 393 which drives the pulley and slip clutch assembly 337.

The other output shaft 396 of the motor 376 is rotatably mounted in a pedestal 397 mounted upon the base plate 386. The output shaft 396 carries a drive pinion 398 which drives a spur gear 399 mounted on the jack shaft 382. An electric clutch 401 is mounted on the jack shaft 382.

From the foregoing, it can be seen that the motor 376 has its one end supported by the pedestal 397 and has its other end supported by the speed reducer 377. The speed reducer 377 is secured to the base plate by cap screws 402.

Operation of the embodiment of the electron beam evaporation source shown in FIGS. 5–9 may now be briefly described as follows. Let it be assumed that the apparatus has been in operation for a period of time that it is desired to place a new ingot in the ingot feed mechanism assembly 311. The ingot support member 343 is retracted by energizing the electric clutch 401 which causes the motive drive means for the lead screw to be placed in high speed operation to rapidly retract the lead screw follower 342 to the rear until the microswitch 366 is operated to stop the operation of the motor 376. The ingot which is in the spindle assembly 201 will be retained within the spindle assembly 201 by the ingot gripper 276. When the ingot support member 343 has been retracted, the ingot 346 has been withdrawn out of the gate valve assembly 291 and the pneumatic operator 298 for the gate valve assembly 291 can be operated to close the gate valve. A high vacuum is applied to the port 301 to maintain the vacuum on the spindle assembly 201 so that the electron beam evaporation source can continue in operation.

The vacuum within the housing 312 is then relieved through a port (not shown). Thereafter, the latch 318 can be released so that the door 16 can be swung to an open position. The ingot clamp assembly 348 is then opened. Another ingot 346 is then taken and the lower end placed on the cap 345 and the upper end secured within the clamping assembly 348.

As soon as the ingot 346 has been placed within the housing 312, the door 316 is closed and the housing 312 is pumped down to place the desired vacuum within the housing 312. As soon as the desired vacuum is reached, the operator 298 for the gate valve mechanism 291 is operated to open the gate valve 302. As soon as the gate valve 302 is opened, the motor 376 is started and the electric clutch 391 is energized to cause the lead screw to be operated at low speed to advance the support member 343 upwardly and to carry therewith the ingot 346 at a continuous and controlled speed. This movement continues until the microswitch 371 which is at the upper end of the housing is actuated to again indicate that another ingot should be placed in the housing 312. Fast or slow operation for raising and lowering is achieved by proper selection and energization of the clutches 391 and 401 and the motor 376 and in particular the selection of the direction of rotation for the motor 376.

In the operation of the remaining apparatus shown in FIGS. 5–9, cooling water is supplied to the various fittings so that cooling water cools the cathode assembly 23 of each of the electron guns 161. Similarly, cooling water is supplied to the magnetic feed-through posts 169. In addition, cooling water is supplied to the shield 186 to cool the same. The ingot is urged upwardly through the hole 193 in the shield 182 by the ingot feed mechanism assembly 311 as hereinbefore described.

A low voltage is supplied to each of the filaments 28 so that they emit electrons in the manner hereinbefore described. A high voltage is applied between the cathode assembly 23 and the anode assembly 51 in the manner hereinbefore described to cause a stream of electrons to flow through the aperture 53 provided in the anode plate 52. The posts 169 serve as pole pieces for the magnets 176 and through the beam focusing plates 167 create a magnetic field for causing the electron beam emanating from the filament 28 to pass through an approximately 270° angle and to impinge upon the ingot in the opening 193.

The spaced double coils 176 which are provided for each of the electron guns assist in focusing or positioning of the beam. By the utilization of the two coils, it is possible to supply more power to one coil than to the other coil to thereby displace the beam sideways. In addition, varying amounts of power can be supplied to both coils at the same time to displace the beam fore and aft. In this manner, it is possible to control each gun individually and to thereby place the beams from the three guns in a triangular pattern on the ingot. This makes it possible to supply a more uniform input of heat to the ingot with a better heat distribution.

The water cooling which is provided for the electron beam evaporation source makes it possible to operate the electron guns at relatively high power as, for example, a total power input of 30 kw. The water-cooled shield protects the base plate from radiation and also keeps the coating material from coating the bottom of the plate for mounting the gun. In addition, the water-cooled shield serves to cool the area surrounding the molten evaporated material.

Of the seals which are provided in the spindle assembly 201, the upper set of seals is provided for sealing the spindle assembly so that the electron guns operate in a high vacuum. The second set of seals from the top is a water seal to permit water to enter and leave the spindle assembly and to cool the spindle assembly. From the arrangement of the seals shown in the spindle assembly, the vacuum conditions from top to bottom of the spindle assembly are from high vacuum to rogh vacuum and then from rough vacuum to atmosphere for the top set of seals. The water seals serve to isolate the two water paths from each other and to separate the water from the atmosphere. On the bottom set of seals, it is from atmosphere to rough vacuum, and from rough vacuum to high vacuum.

From the foregoing, it can be seen that an electron beam evaporation source has been provided which can be operated continuously for long periods of time. The water cooling which is employed prevents it from overheating and the ingot feeding means which is provided permits the apparatus to be continuously fed and it will not run out of material. Another important feature of the apparatus which is shown in FIGS. 5–9 is that the ingot is rotated as it is evaporated which will give a more uniform distribution from the source and make possibe repeatability.

In the electron beam evaporation source shown in FIGS. 1–4, the electron gun is water-cooled and is shielded so that there is practically no arcing from the electron gun. This makes it possible to provide a very uniform evaporation rate from the gun and to control the rate of evaporation. The water-cooled crucible is rotated to again achieve a high degree of uniformity in the rate of evaporation from the crucible.

We claim:

1. In an electron beam evaporation source, a base plate formed of a non-magnetic material, at least one electron gun mounted on the base plate, said electron gun including a cathode assembly mounted above the base plate and adapted to emit a stream of electrons, an anode assembly mounted above the base plate for accelerating the electrons away from the cathode assembly, means forming a recess having an open top ide which lies in a horizontal plane, said means forming a recess which is adapted to receive material to be evaporated and to position the same so that the exposed surface of the material lies in a generally horizontal plane, means carried by the base plate and forming a magnetic field to cause the electron stream passing from the anode assembly to travel in a path so that it strikes the material to evaporate the same, said means carried by the base plate and forming a magnetic field including first and second generally vertical, spaced parallel pole pieces extending through the base plate, magnetic coil means secured to the pole pieces below the base plate, and a pair of spaced plates secured to the pole pieces above the base plate and being supported solely by said first and second pole pieces, said spaced plates extending from the pole pieces toward said means forming a reces on opposite sides thereof, and means for rotating said means forming a recess about a generally vertical axis at a uniform speed so that the material is evaporated at a very uniform rate to provide an evaporant having a highly symmetrical and repeatable distribution.

2. A source as in claim 1 together with means for supplying a cooling liquid to the cathode assembly.

3. A source as in claim 2 wherein said cathode assembly comprises a body of conducting material having an outwardly facing recess therein and horizontal bores opening into the recess and extending axially thereof, a helically wound filament in said recess and having its ends extending into said bores and means securing said end of said filaments in said bores.

4. A source as in claim 1 together with a shielding plate mounted on said base plate, said body of material being centrally disposed within said shielding plate.

5. A source as in claim 4 together with means for supplying liquid coolant to said shielding plate.

6. A source as in claim 1 together with means for supplying a liquid coolant to said pole pieces.

7. In an electron beam evaporation source, a base plate formed of a non-magnetic material and lying in a generally horizontal plane, at least one electron gun mounted on the base plate, said electron gun including a cathode assembly adapted to emit a stream of electrons, an anode assembly mounted on the base plate for accelerating the electrons away from the cathode assembly, an ingot of material to be evaporated, means mounted on the plate to form a magnetic field to cause the electron beam to travel in a path so that it strikes the ingot of material, means for rotating the supporting the ingot of material, means for rotating the rial and progressively evaporates the same, spindle means supporting the ingot of material, means for rotating the spindle means and means independent of the means for rotating the spindle means engaging the ingot of material for progressively raising the ingot of material in a vertical direction into the electron beam so that a supply of the material is continuously supplied to the electron beam for evaporation.

8. A source as in claim 7 together with a shielding plate surrounding the body of material in the vicinity of the region where the body of material is engaged by the electron beam, and means for supplying a cooling liquid to the shielding plate.

9. A source as in claim 7 together with means for cooling the means for supporting the body of material.

10. A source as in claim 7 together with means mounted in the support means for yieldably gripping an ingot to permit movement of the ingot in only one direction.

11. A source as in claim 7 together with means carried by the support means for rotating the ingot as it is being advanced.

12. A source as in claim 11 together with means for maintaining a vacuum on the ingot as it is advanced.

13. A source as in claim 7 wherein said means for progressively raising the ingot includes motive drive means and clutch means for causing the same to be operated at a relatively high speed or a relatively low speed.

14. A source as in claim 7 wherein said means mounted on the base plate forming a magnetic field includes a pair of relatively large plates disposed on opposite sides of the cathode assembly, first and second pole pieces secured to said plates, a first coil mounted on said first pole piece, a second coil mounted on said second pole piece, means mounted on the lower extremities of said pole pieces for completing a magnetic path, and means for supplying power to said coils whereby the angle of the electron beam with respect to the source can be shifted in one direction by varying the power applied to the coils and whereby the point of impingement can be shifted in a direction at right angles to said first direction by changing the power applied to both the coils.

15. A source as in claim 14 together with means for supplying a cooling liquid to said pole pieces.

16. In an electron beam evaporation source, a base plate formed of a non-magnetic material, at least one electron gun mounted on the base plate, said electron gun including a cathode assembly adapted to emit a stream of electrons, an anode assembly mounted on the base plate for accelerating the electrons away from the cathode assembly, a body of material to be evaporated and disposed away from the cathode assembly and means mounted on the base plate to form a magnetic field to cause the electron beam to travel in a path so that it strikes the body of material and progressively evaporates the same, said means mounted on the base plate to form a magnetic field including a pair of spaced generally parallel pole pieces mounted on the base plate and extending through the base plate, said pole pieces extending in a generally vertical direction and being disposed in the vicinity of the cathode assembly, a pair of spaced plates secured to the pole pieces and being carried solely by said pair of pole pieces and means forming a magnetic coil secured to said pole pieces below said base plate for supplying magnetic lines of force to said plates, said plates extending generally forwardly and rearwardly of the cathode assembly and being disposed out of the space between the cathode assembly and the body of material to be evaporated.

17. In a electron beam evaporation source, a base plate, at least one electron gun mounted on the base plate, said electron gun including a cathode assembly mounted on the base plate and adapted to emit a stream of electrons, said cathode assembly including a block-like means formed of a conducting material and having an outwardly facing recess formed therein and having axially aligned bores on opposite sides of the recess and opening into the recess, a helically wound filament disposed in the recess and having its ends disposed in said bores, and means securing the ends of said filament in said bores, at least one of said bores extending through said block-like means so that the filament can be readily inserted and removed.

18. A source as in claim 17 wherein said recess has its outer extremity lying in a generally vertical plane and wherein said helically wound filament lies in a horizontal plane.

19. A source as in claim 18 wherein said block-like means is formed in two separate parts together with means for supplying a cooling liquid to said two separate parts.

20. In an electron beam evaporation source, a base plate formed of a non-magnetic material and lying in a generally horizontal plane, at least one electron gun mounted on the base plate, said electron gun including a cathode assembly adapted to emit a stream of electrons, an anode assembly mounted on the base plate for accelerating the electrons away from the cathode assembly, said base plate having a recess therein through which an ingot of material to be evaporated can be advanced, means carried by the base plate for forming a magnetic field to cause the electron beam to travel in a path so that it strikes an ingot of material in the recess and progressively evaporates the same, a vacuum-tight housing carried by the base plate, a reclosable opening formed in said vacuum-tight housing, ingot supporting means mounted within the body for supporting an ingot of material, said reclosable opening formed in said housing being of a size so as to permit an ingot of material to be inserted through the opening and into the ingot supporting means, and means carried by the housing for progressively raising an ingot of material in a vertical direction so that a supply of the material is continuously supplied in the recess to the electron beam for evaporation, and valve means carried by the base plate for establishing a vacuum-tight seal between said housing and said recess in said base plate.

21. A source as in claim 20 wherein said ingot supporting means includes an ingot engaging member disposed within the housing, and means carried by the housing for advancing and retracting the ingot engaging member.

22. A source as in claim 20 wherein said means for supporting said ingot includes clamp means for engaging the upper end of the ingot and for guiding the same into said recess in said base plate and also for preventing said ingot from dropping when said ingot engagaing member is retracted.

References Cited

UNITED STATES PATENTS

| | | | |
|---|---|---|---|
| 2,972,652 | 2/1961 | Seemann et al. | 13—31 X |
| 3,202,794 | 8/1965 | Shrader et al. | 13—31 X |
| 3,250,842 | 5/1966 | Hikido | 13—31 |
| 3,329,524 | 7/1967 | Smith, Jr. | 117—107 |
| 3,446,934 | 5/1969 | Hanks | 13—31 X |
| 3,450,824 | 6/1969 | Hanks et al. | 13—31 |
| 3,488,426 | 1/1970 | Dietzel | 13—31 |
| 3,497,602 | 2/1970 | DuBois | 13—31 |
| 3,360,600 | 12/1967 | DuBois | 13—31 |
| 3,379,819 | 4/1968 | Houde | 13—31 |
| 3,420,977 | 1/1969 | Hanks et al. | 219—121 EB |

BERNARD A. GILHEANY, Primary Examiner

R. N. ENVALL, Jr., Assistant Examiner